US010948895B2

(12) United States Patent
Hashimoto

(10) Patent No.: US 10,948,895 B2
(45) Date of Patent: Mar. 16, 2021

(54) INFORMATION PROCESSING APPARATUS, MACHINING SYSTEM, DATA STRUCTURE, AND DATA PROCESSING METHOD

(71) Applicant: Murata Machinery, Ltd., Kyoto (JP)

(72) Inventor: Tatsuki Hashimoto, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 301 days.

(21) Appl. No.: 15/777,471

(22) PCT Filed: Oct. 18, 2016

(86) PCT No.: PCT/JP2016/080814
§ 371 (c)(1),
(2) Date: May 18, 2018

(87) PCT Pub. No.: WO2017/086074
PCT Pub. Date: May 26, 2017

(65) Prior Publication Data
US 2018/0299867 A1 Oct. 18, 2018

(30) Foreign Application Priority Data
Nov. 19, 2015 (JP) .............................. JP2015-226367

(51) Int. Cl.
*G05B 19/4097* (2006.01)
*B23K 26/38* (2014.01)
(Continued)

(52) U.S. Cl.
CPC ...... *G05B 19/4097* (2013.01); *B23K 26/0093* (2013.01); *B23K 26/38* (2013.01); *B21D 5/004* (2013.01); *B21D 28/00* (2013.01); *B23K 2101/18* (2018.08); *G05B 2219/35012* (2013.01); *G05B 2219/36203* (2013.01);
(Continued)

(58) Field of Classification Search
CPC ...... G05B 19/4097; G05B 2219/35012; G05B 2219/36203; G05B 2219/45041; G05B 2219/45137; B23K 26/0093; B23K 26/38; B23K 2101/18; Y02P 90/02; B21D 5/004; B21D 28/00
See application file for complete search history.

(56) References Cited

U.S. PATENT DOCUMENTS

2006/0079989 A1* 4/2006 Ishii ........................ G06F 30/00
700/182
2012/0109587 A1 5/2012 Ishi et al.

FOREIGN PATENT DOCUMENTS

EP 2 687 933 A1 1/2014
EP 2687933 A1 * 1/2014 ....... G05B 19/40938
(Continued)

Primary Examiner — Tejal Gami
(74) Attorney, Agent, or Firm — DLA Piper LLP (US)

(57) ABSTRACT

An information processing apparatus is capable of reducing a burden on an operator to process data exchanged between systems. An information processing apparatus processes data including a data structure defining a plurality of machining processes selected from a laser cutting process, a punch cutting process, and a non-cutting process and implemented on a plate workpiece. The data structure includes shape information defining positions of machining lines that serve as targets of the machining processes, and machining information defining a type of each machining process corresponding to each machining line among the machining processes.

15 Claims, 12 Drawing Sheets

(51) Int. Cl.
*B23K 26/00* (2014.01)
*B23K 101/18* (2006.01)
*B21D 5/00* (2006.01)
*B21D 28/00* (2006.01)

(52) U.S. Cl.
CPC .............. *G05B 2219/45041* (2013.01); *G05B 2219/45137* (2013.01); *Y02P 90/02* (2015.11)

(56) References Cited

FOREIGN PATENT DOCUMENTS

| | | |
|---|---|---|
| JP | 2003-88919 A | 3/2003 |
| JP | 2005-234760 A | 9/2005 |
| JP | 2006-139685 A | 6/2006 |
| JP | 2012-208921 A | 10/2012 |

\* cited by examiner

INFORMATION PROCESSING APPARATUS, MACHINING SYSTEM, DATA STRUCTURE, AND DATA PROCESSING METHOD

TECHNICAL FIELD

This disclosure relates to an information processing apparatus, a machining system, a data structure, and a data processing method.

BACKGROUND

A method of manufacturing parts from a plate workpiece includes forming various outer shapes of the parts on the workpiece, and cutting the workpiece along lines defining the outer shapes of the parts to cut out the parts from the workpiece. The method may further include a machining process performed before or after the parts are cut out. Examples of such a machining process include a tapping machining process using a tap and a dice, a marking machining process, and a forming machining process such as bending using a press brake or the like. Numerical control is performed on a machining device performing these various machining processes on the basis of a machining program such as machining control data (hereinafter, referred to as an NC data) (see Japanese Patent Application Publication No. 2005-234760, for example).

For example, the NC data is generated as follows. First, a designer designs a part with a design device having three-dimensional computer-aided design (CAD) or computer-aided manufacturing (CAM) and the like installed. Design information, representing the resultant design, is output in a format such as a Drawing Exchange Format (DXF), to be information on an expanded plan view of the part. The design information, output from the design device, is input to an information processing apparatus for a machining device having two-dimensional CAD or CAM and the like installed. The design information input to the information processing apparatus for the machining device includes information on shapes of the parts, but includes no information on a machining process for each of the shapes. Thus, the operator designates the type (such as cutting or bending) of the machining process for each machining line, and then causes the information processing apparatus to generate the NC data defining the operation of the machining device.

In the conventional technique, the information on the type of the machining process is lacking in data exchanged between systems such as the design information output to the information processing apparatus for the machining device from the design device. This requires data processing imposing a large burden on the operator. For example, parts may be manufactured through a cutting machining process and a forming machining process. In such a configuration, the operator is required to assign the type of machining process to a machining line that serves a target of the cutting machining process to generate NC data for a machining device that performs the cutting machining process. Furthermore, the operator is required to assign the type of machining process to a machining line that serves a target of the forming machining process to generate NC data for a machining device that performs the forming machining process.

It could therefore be helpful to provide an information processing apparatus, a machining system, a data structure, and a data processing method capable of reducing the burden on an operator to process data exchanged between systems.

SUMMARY

I thus provide:

An information processing apparatus processes design information including a data structure defining a plurality of machining processes selected from a laser cutting process, a punch cutting process, and a non-cutting process and implemented on a plate workpiece. The data structure includes shape information defining positions of machining lines that serve as targets of the machining processes, and machining information defining a type of each machining process corresponding to each machining line among the machining processes. The shape information and the machining information are described in XML. The information processing apparatus includes an inputter that receives an input of the design information, and an extractor that extracts information corresponding to the type of the machining process from the design information input to the inputter.

The machining information may include position information on a machining line described in a tag set for each type of machining process, the extractor may extract the position information on the machining line corresponding to the type of machining process with reference to the tag. The information processing apparatus may include a processor that processes the information extracted by the extractor. The processor may generate numerical control data to be used for control on the machining device that performs the machining process corresponding to the information extracted by the extractor. The design information may include the shape information and the machining information on a part made out of the plate workpiece through the plurality of machining processes, and the information processing apparatus may include a nesting information generator that generates nesting information showing, in XML, a plurality of the parts arranged in the plate workpiece. The non-cutting process may include at least one of a forming machining process, a tapping machining process, and a marking machining process.

A machining system includes the above-described information processing apparatus, and a machining device that performs a machining process on the plate workpiece on the basis of data supplied from the information processing apparatus.

A data structure defines a plurality of machining processes selected from a laser cutting process, a punch cutting process, and a non-cutting process and implemented on a plate workpiece and includes shape information defining positions of machining lines that serve as targets of the machining processes, and machining information defining a type of each machining process corresponding to each machining line among the machining processes. The shape information and the machining information are described in XML.

An information processing method processes design information including a data structure defining a plurality of machining processes selected from a laser cutting process, a punch cutting process, and a non-cutting process and implemented on a plate workpiece. The data structure includes shape information defining positions of machining lines that serve as targets of the machining processes, and machining information defining a type of each machining process corresponding to each machining line among the machining processes. The shape information and the machining information are described in XML. The information processing method includes receiving an input of the design information, and extracting information corresponding to the type of the machining process from the design information.

The data structure of the data includes shape information defining positions of machining lines that serve as targets of the machining processes, and machining information defining a type of each machining process corresponding to each machining line among the machining processes. The shape information and the machining information are described in XML. The information corresponding to the type of the machining process is extracted from the data. Thus, the operator is less likely to be required to assign the type of machining process for data processing, whereby a burden on the operator can be reduced. XML features excellent extensibility, which enables the types of machining processes to be increased, and high versatility, which requires no large-scale modification in the system.

The machining information may include position information on a machining line described in a tag set for each type of machining process, and the extractor may extract the position information on the machining line corresponding to the type of machining process with reference to the tag. In this configuration, with the data structure of XML, the type of machining process can be easily identified and can be easily associated with position information on a machining line. If the information processing apparatus includes a processor that processes the information extracted by the extractor, the extractor extracts information corresponding to the type of machining process, and the processor is able to automatically perform the processing corresponding to the type of machining process, for example. Thus, a burden on the operator can be reduced. If the processor generates numerical control data to be used for control on the machining device that performs the machining process corresponding to the information extracted by the extractor, for example, numerical control data for a machining device corresponding to the type of machining process can be automatically generated. Thus, a burden on the operator can be reduced. If the data includes the shape information and the machining information on a part made out of the plate workpiece through the plurality of machining processes, and the information processing apparatus includes a nesting information generator that generates nesting information showing, in XML, a plurality of the parts arranged in the plate workpiece, nesting information in which a machining line and the type of machining process are associated with each other, for example, can be automatically generated. Thus, a burden on the operator can be reduced. If the cutting machining process includes at least one of a laser machining process and a punch machining process, for example, an accurate laser machining process, an efficient punch machining process, and the like can be achieved. If the non-cutting process includes at least one of a bending machining process, a tapping machining process, a forming machining process, and a marking machining process, various types of parts can be processed.

Figure 1:
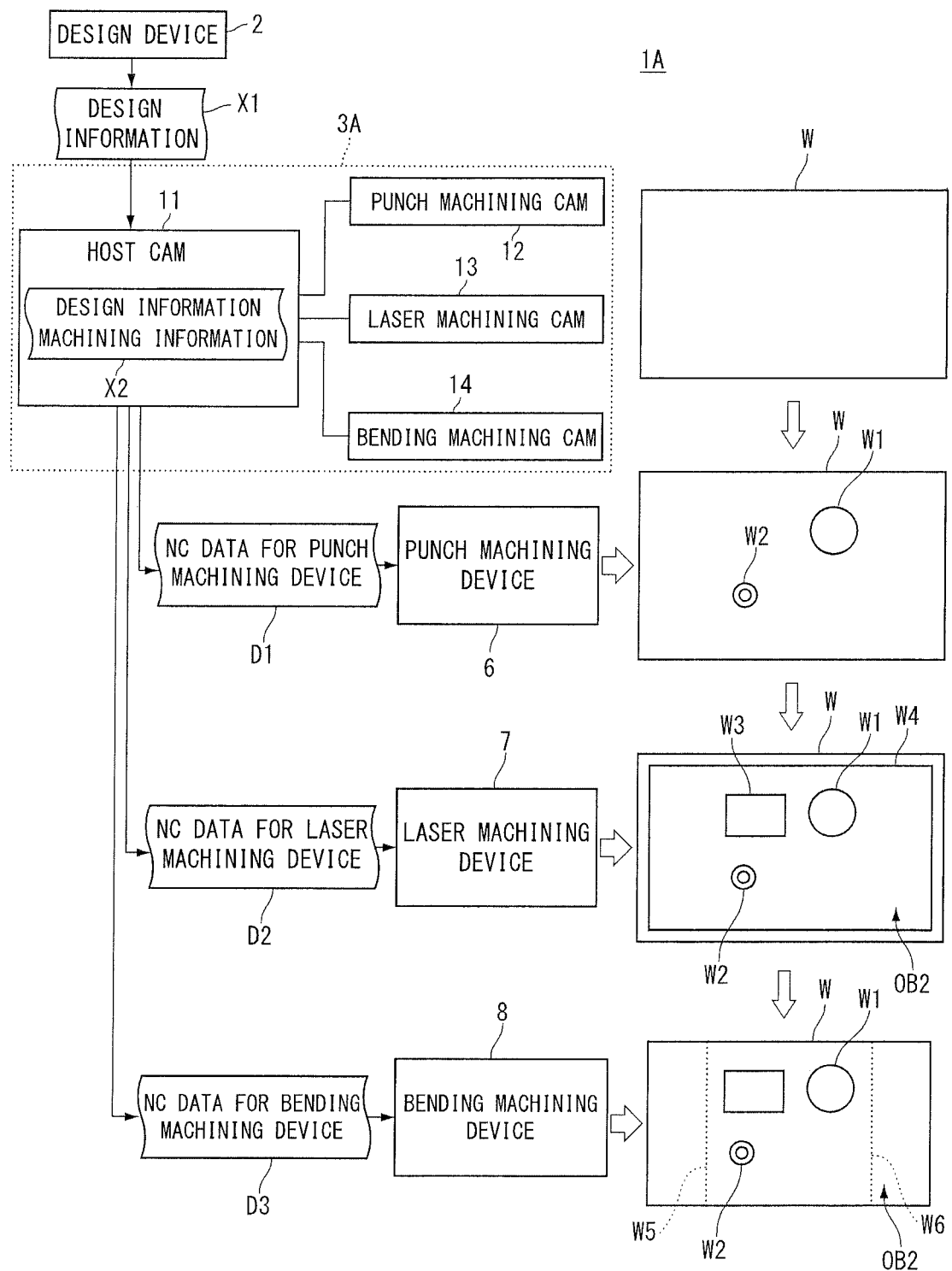
FIG. 1 is a conceptual diagram illustrating an example of a machining system to which an information processing apparatus according to a first example is applied.

DESCRIPTION OF REFERENCE SIGNS 1A, 1B, 1C, 1D machining system
3A, 3B, 3D information processing apparatus
6 punch machining device
7 laser machining device
8 bending machining device
11 inputter
12 extractor
13 processor
51 nesting information generator
W workpiece

DETAILED DESCRIPTION

First Example

A first example will now be described. FIG. 1 is a conceptual diagram illustrating an example of a machining system 1A to which an information processing apparatus is applied. The machining system 1A includes a design device 2, an information processing apparatus 3A, a punch machining device 6, a laser machining device 7, and a bending machining device 8.

The design device 2 is used to design parts manufactured from a plate workpiece W with the machining system 1A. For example, the design device 2 is a computer system having three-dimensional CAD installed. The design device 2 has a body provided with a general-purpose processor such as a central processing unit (CPU), a working memory such as a dynamic random access memory (DRAM) and the like. A mass storage device such as a hard disk drive (HDD), a display device such as a liquid crystal display, and an input device such as a mouse and a keyboard are connected to the body. For example, the mass storage device stores therein a design program such as CAD, and the body reads the design program from the mass storage device to execute various types of processes. The design program may be a general-purpose product available on the market or may be a dedicated product for the machining system 1A. The design device 2 is able to output an XML file X1 describing design information on parts in Extensible Markup Language (XML) to the outside. For example, the design result can be output in the XML format with an add-in embedded in a general-purpose design program. The design device 2 may be a device outside the machining system 1A.

Figure 2:
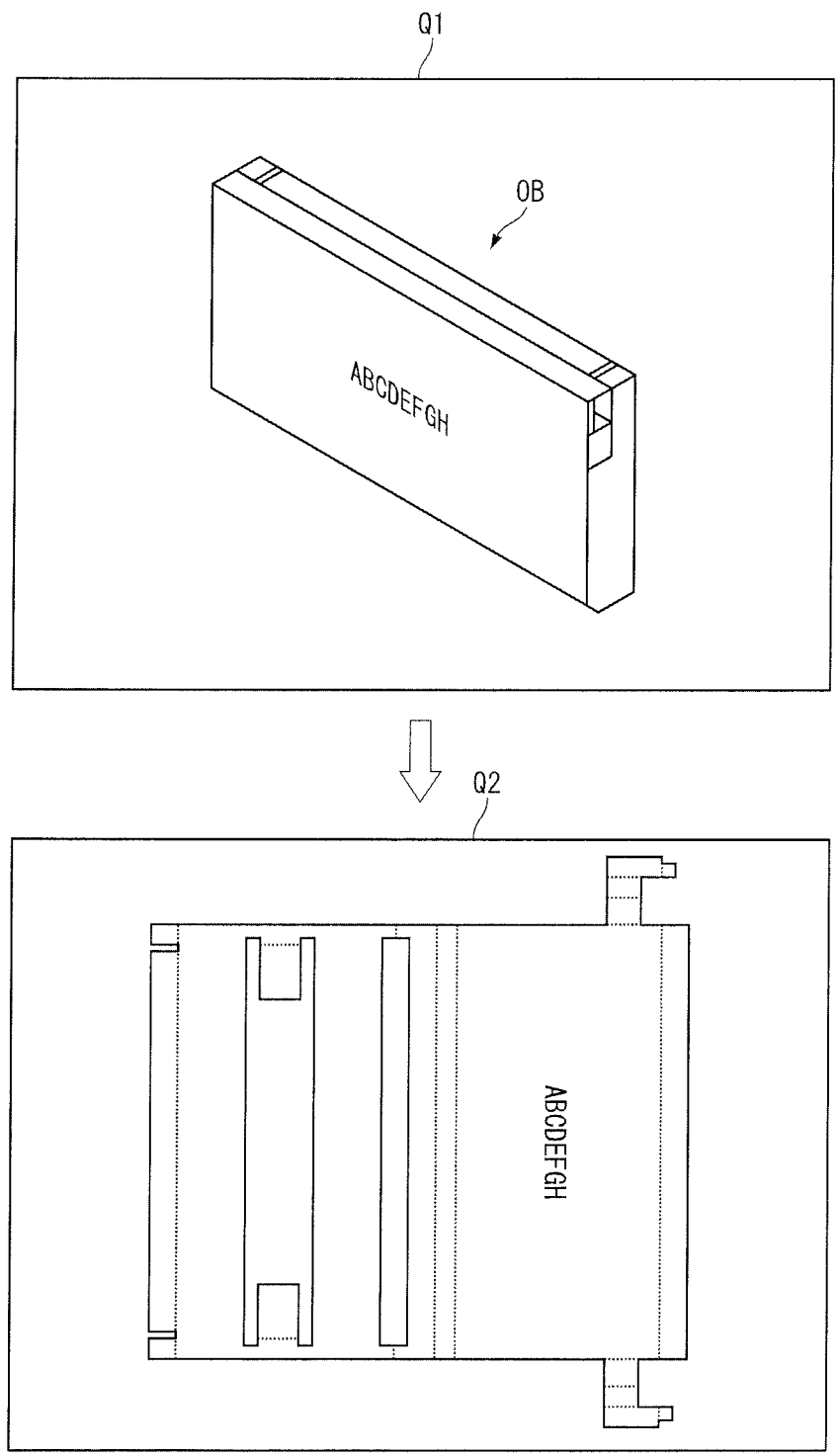
FIG. 2 is a conceptual diagram illustrating how a design device operates.

FIG. 2 is a conceptual diagram illustrating how the design device 2 operates. A designer (user) can design a part, manufactured with the machining system 1A, on the design device 2. Reference sign Q1 denotes a screen of the display device of the design device 2, and reference sign OB denotes an example of a design object (design result) displayed on the screen Q1. The design object OB has a three-dimensional shape, and is manufactured by performing various machining processes on a plate workpiece. Examples of the various machining processes include a punch machining process using a cutting blade, a cutting machining process using laser irradiation, and a forming machining process such as bending. The design device 2 generates two-dimensional information Q2 representing a developed plan view of the three-dimensional design object OB. In the example illustrated in FIG. 2, solid lines represent machining lines indicating cutting positions, and dotted lines represent machining lines indicating bending positions, and "ABCDEFGH" represents a mark formed in a marking machining process. The design device 2 generates the two-dimensional information Q2, and outputs an XML file X1 (see FIG. 1) corresponding to the two-dimensional information Q2.

Referring back to FIG. 1, the information processing apparatus 3A generates machining information indicating the type of machining process, on the basis of the XML file X1 of the design information. For example, the information processing apparatus 3A generates an XML file X2 in which machining information is added to the design information. The information processing apparatus 3A includes a host CAM 11, a punch machining CAM 12, a laser machining CAM 13, and a bending machining CAM 14. The host CAM 11, the punch machining CAM 12, the laser machining CAM 13, and the bending machining CAM 14 may be implemented in a single computer system. Alternatively, at least one of the CAMs may be implemented in another computer system different from the computer system in which the other CAMs are implemented. The host CAM 11 causes the punch machining CAM 12, the laser machining CAM 13, and the bending machining CAM 14 to generate machining information corresponding to respective machining processes. The information processing apparatus 3A generates an XML file X2 showing machining information in XML. The XML file X2 includes design information and machining information.

Figure 3:
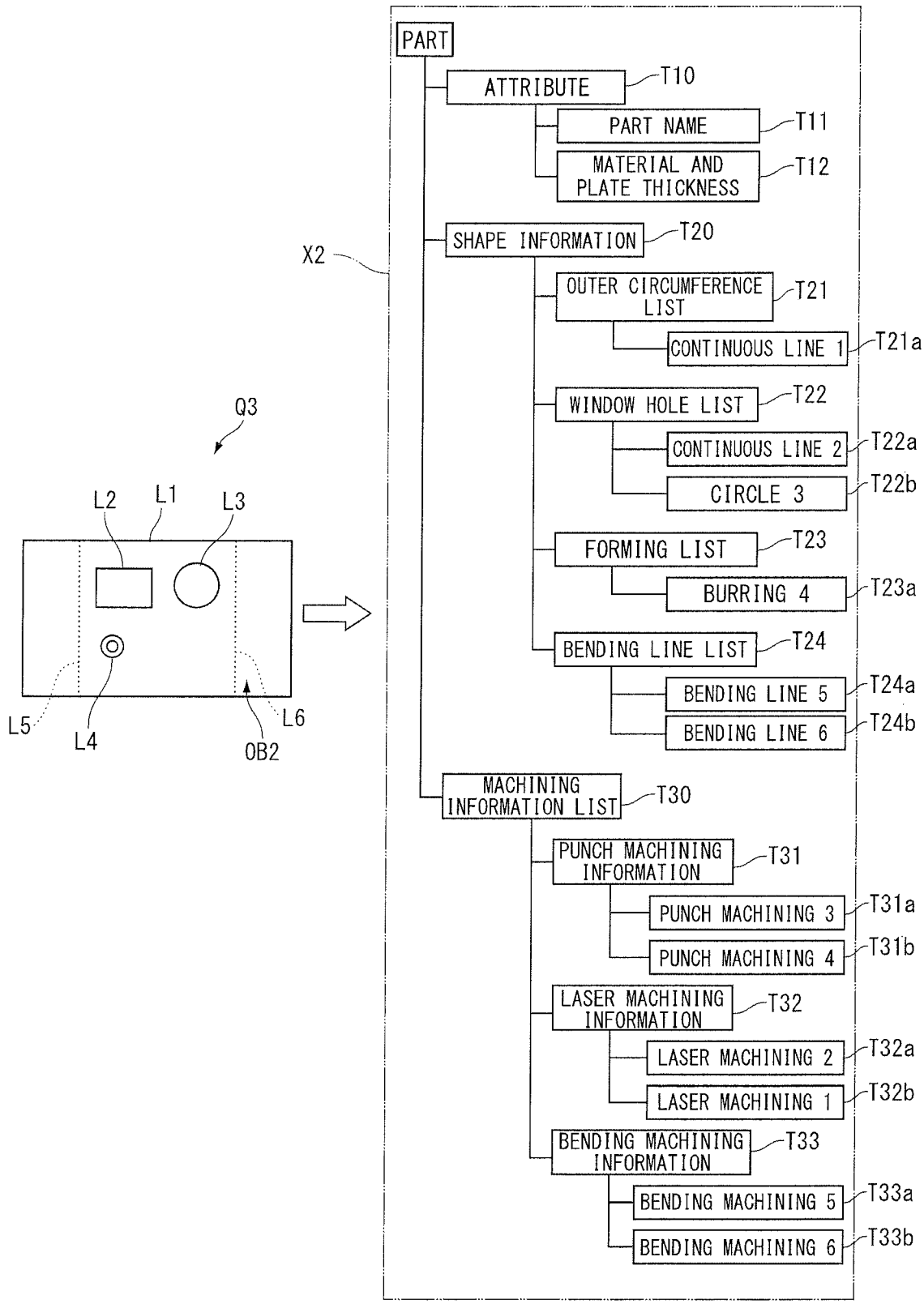
FIG. 3 is a conceptual diagram illustrating an example of an XML file of a data structure according to the example.

FIG. 3 is a conceptual diagram illustrating an example of the XML file X2 of the data structure. Reference sign Q3 (on the left side in the figure) denotes a plate member corresponding to a part, in a developed plan view, before the machining process. The plate member Q3 includes machining lines L1 to L6 that serve as targets of machining processes. The machining line L1 is a line to cut along in the laser machining process and corresponds to an outer circumference of the part in the developed plan view. The machining line L2 is a line to cut along in the laser machining process and corresponds to a single window hole in the part. The machining line L3 is a line to cut along in the punch machining process and corresponds to a single window hole in the part. The machining line L4 corresponds to a position subjected to burring in the forming machining process. The machining lines L5 and L6 correspond to lines bent in the forming machining process.

The data structure (XML file X2) according to the example defines a plurality of machining processes selected from a laser cutting process, a punch cutting process, and a non-cutting process and implemented on a plate workpiece. The non-cutting process includes at least one of, for example, a bending machining process, a tapping machining process, a forming machining process, and a marking machining process. The XML file X2 includes shape information (tag T20) and machining information (tag T30), and the shape information and the machining information are described in XML. The shape information defines positions of the machining lines L1 to L6 serving as targets of machining processes. The machining information defines the types of machining processes corresponding to the respective machining lines L1 to L6.

The XML file X2 features a tiered structure of tags. Storing between a start tag and an end tag will be hereinafter simply referred to as storing in a tag. The XML file X2 has a structure featuring corresponding information stored in each tag. A higher level tag T10 corresponds to information on "attribute". Tags T11 and T12 are subordinate to the tag T10 and respectively have an element name "part name" and an element name "material and plate thickness". The tag T11 stores the name of the part designated by the user and the tag T12 stores the material and the plate thickness of the workpiece.

A higher level tag T20 corresponds to information on "shape information". Tags T21, T22, T23, and T24 are subordinate to the tag T20 and respectively have an element name "outer circumference list", an element name "window hole list", an element name "forming list", and an element name "bending line list". The tag T21 is provided with a tag T21*a* having an element name "continuous line 1". The continuous line 1 is an element name of the machining line L1. In the example illustrated in FIG. 3, the machining line L1 defines a rectangular shape, and the coordinates of each of both ends of each side of the machining line L1 are stored in the tag T21*a*, for example.

The tag T22 is provided with a tag T22*a* having an element name "continuous line 2" and a tag T22B having an element name "circle 3". The "continuous line 2" is the element name of the machining line L2. In the example illustrated in FIG. 3, the machining line L2 defines a rectangular shape, and the coordinates of each of both ends of each side of the machining line L2 are stored in the tag T22*a*, for example. The "circle 3" is the element name of the machining line L3. In the example illustrated in FIG. 3, the machining line L3 defines a circular shape, and the center coordinates and the diameter of the machining line L2 are stored in the tag T22*b*.

The tag T23 is provided with a tag T23*a* having an element name "burring". The "burring" is the element name of the machining line L4, and information on the center coordinates of the machining line L3, the size of a pilot hole, a size of a forming target area of the machining process, and the like are stored in a tag T23*a*. The tag T24 is provided with tags T24*a* and T24*b* respectively having an element name "bending line 5" and an element name "bending line 6". The "bending line 5" and "bending line 6" are respectively the element names of the machining lines L5 and L6. Both end coordinates and a bending angle of the machining line L5, and an elongation value due to the bending are stored in the tag T24*a*. Both end coordinates, a bending angle of the machining line L6, and an elongation value due to the bending are stored in the tag T24*b*. The tags T20 and T30 are generated by the design device 2 and included in the XML file X1 of the design information.

The upper level tag T30 has an element name "machining information list" and corresponds to information on "machining information". The tag T30 is generated by the information processing apparatus 3A. Tags T31, T32, and T33 are subordinate to the tag T30 and respectively have an element name "punch machining information", an element name "laser machining information", and an element name "bending machining information".

The tag T31 corresponds to machining information defining the types of the machining processes performed by the punch machining device 6 (see FIG. 1) on the machining lines L3 and L4. The tag T31 is generated by the punch machining CAM 12. The tag T31 is provided with tags T31a and T31b respectively having an element name "punch machining process 3" and an element name "punch machining process 4". The "punch machining process 3" is machining information corresponding to the machining line L3 and includes various types of information on the machining line L3 including the position, the order of the machining process, required accuracy, and a tool used for the machining process. The "punch machining process 4" is machining information corresponding to the machining line L4, and includes various types of information on the machining line L4, as in the "punch machining process 3".

The tag T32 corresponds to machining information defining the types of machining processes performed by the laser machining device 7 (see FIG. 1) on the machining lines L1 and L2. The tag T32 is generated by the laser machining CAM 13. The tag T32 is provided with tags T32a and T32b respectively having an element name "laser machining process 2" and an element name "laser machining process 1". The "laser machining process 2" is machining information corresponding to the machining line L2 and includes various types of information on the machining line L2 including the position, the order of the machining process, and required accuracy. The "laser machining process 1" is machining information corresponding to the machining line L1, and includes various types of information on the machining line L1, as in the "laser machining process 2".

The tag T33 corresponds to machining information defining the types of machining processes performed by the bending machining device 8 (see FIG. 1) on the machining lines L5 and L6. The tag T33 is generated by the bending machining CAM 14. The tag T33 is provided with tags T33a and T33b respectively having an element name "bending machining process 5" and an element name "bending machining process 6". The "bending machining process 5" is machining information corresponding to the machining line L5 and includes various types of information on the machining line L5 including the position, the order of the machining process, a bent angle, an elongation of the part due to bending, and required accuracy. The "bending machining process 6" is machining information corresponding to the machining line L6, and includes various types of information on the machining line L6, as in the "bending machining process 5".

The data structure (XML file X2) described above is merely an example, and can be changed in various ways including adding or deleting a tag (element) or changing information stored in a tag. For example, the data structure may include information corresponding to at least one of the items including tolerance information, configuration (assembly or composition) information, information on conveyance into the machining device, and information on conveyance out of the machining device. In the example illustrated in FIG. 3, the XML file X2 includes the three items of the machining information: the "punch machining information", the "laser machining information", and the "bending machining information". One of the three items may not be included. For example, the data structure may include machining information on a laser cutting process and machining information on a punch cutting process, but not include machining information on a non-cutting process. Alternatively, for example, the data structure may include machining information on a laser cutting process and machining information on a non-cutting process, but not include machining information on a punch cutting process. Alternatively, for example, the data structure may include machining information on a punch cutting process and machining information on a non-cutting process, but not include machining information on a laser cutting process. Alternatively, the data structure may include machining information corresponding to two or more types of machining processes as machining information on a non-cutting process.

Figure 4:
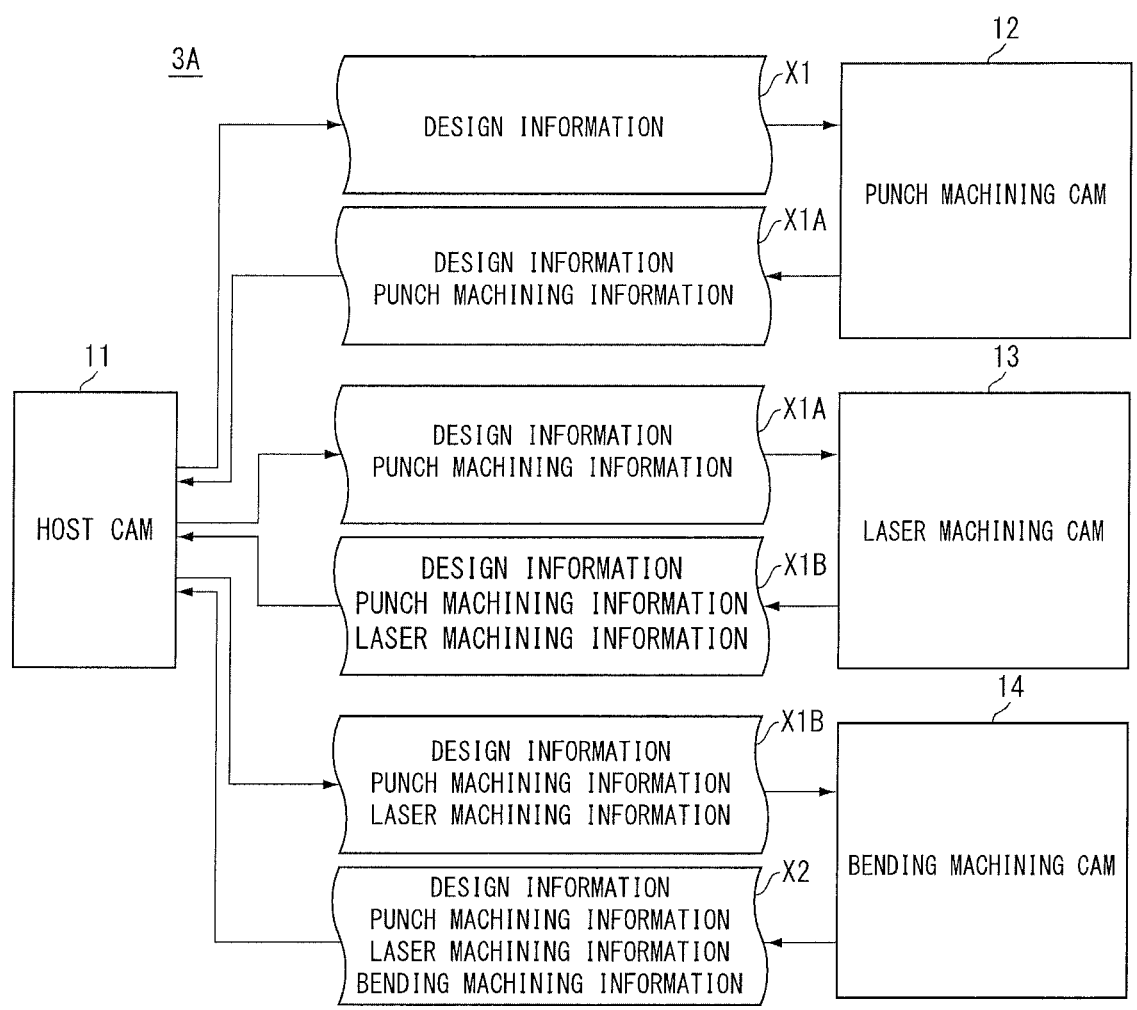
FIG. 4 is a conceptual diagram illustrating an example of how the information processing apparatus operates in generating machining information.

FIG. 4 is a conceptual diagram illustrating an example of how the information processing apparatus 3A operates in generating the machining information. The host CAM 11 issues a data generation command to the punch machining CAM 12, to cause the punch machining CAM 12 to generate the punch machining information (see the tag T31 in FIG. 3). The punch machining CAM 12 holds various types of information on the punch machining device 6. Examples of the various types of information on the punch machining device 6 include a mold type, an operation of each shaft, and a coordinate system used by the punch machining device 6. The punch machining CAM 12 supplies information, required for the punch machining process, to the host CAM 11. For example, the XML file X1 of the design information is supplied to the punch machining CAM 12. The data generation command from the host CAM 11 includes information on the machining line serving as a target of the punch machining process designated by the user for a shape in the design information. The punch machining CAM 12 generates punch machining information using various types of information on the punch machining device 6. The punch machining CAM 12 generates an XML file X1A in which punch machining information is added to the design information X1, and supplies the XML file X1A to the host CAM.

The host CAM 11 issues a data generation command to the laser machining CAM 13, to cause the laser machining CAM 13 to generate the laser machining information (see the tag T32 in FIG. 3). The laser machining CAM 13 holds various types of information on the laser machining device 7. The laser machining CAM 13 supplies information, required for the laser machining process, to the host CAM 11. For example, the XML file X1A, obtained by adding the punch machining information to the design information, is supplied to the laser machining CAM 13. The data generation command from the host CAM 11 includes information on the machining line serving as a target of the laser machining process designated by the user for a shape in the design information. The laser machining CAM 13 generates laser machining information using various types of information on the laser machining device 7. The XML file X1A received by the laser machining CAM 13 includes punch machining information, and the laser machining CAM 13 may generate laser machining information by having reflected thereon the punch machining information. For example, the laser machining CAM 13 may generate laser machining information matching the punch machining information. The laser machining CAM 13 generates an XML file X1B in which laser machining information is added to the XML file X1A, and supplies the XML file X1B to the host CAM.

The host CAM 11 issues a data generation command to the bending machining CAM 14, to cause the bending machining CAM 14 to generate the bending machining information (see the tag T33 in FIG. 3). The bending machining CAM 14 holds various types of information on the bending machining device 8. The bending machining CAM 14 supplies information, required for the bending machining process, to the host CAM 11. For example, the XML file X1B, obtained by adding the punch machining information and the laser machining information to the design information, is supplied to the bending machining CAM 14. The data generation command from the host CAM 11 includes information on the machining line serving as a target of the bending machining process designated by the user for a shape in the design information. The bending machining CAM 14 generates bending machining information using various types of information on the bending machining device 8. The XML file X1B received by the bending machining CAM 14 includes punch machining information and laser machining information, and the bending machining CAM 14 may generate bending machining information by having reflected thereon at least one of the punch machining information and the laser machining information. The bending machining CAM 14 generates an XML file X2 in which bending machining information is added to the XML file X1B, and supplies the XML file X2 to the host CAM.

Figure 5:
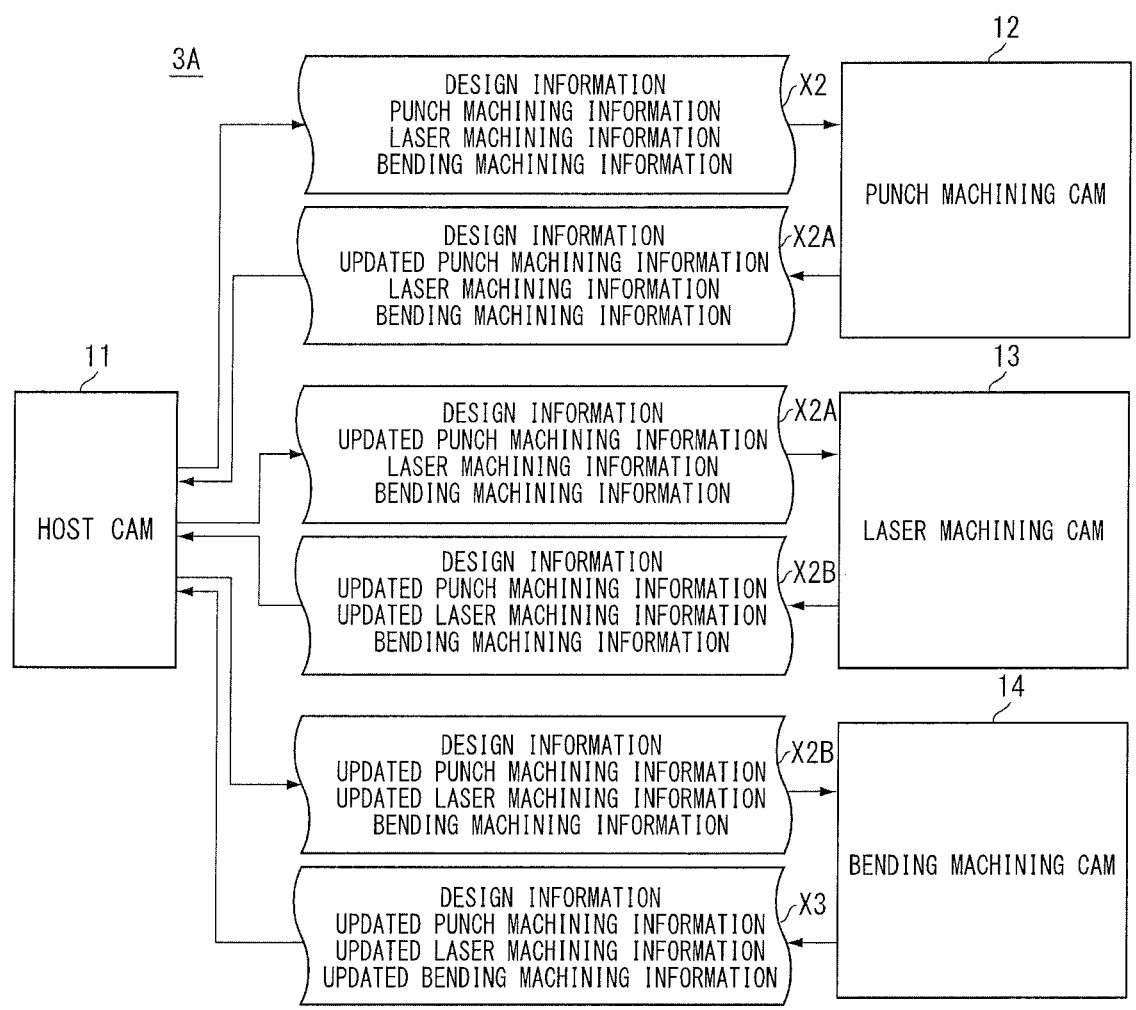
FIG. 5 is a conceptual diagram illustrating another example of how the information processing apparatus operates in generating the machining information.

FIG. 5 is a conceptual diagram illustrating another example of how the information processing apparatus 3A operates in generating the machining information. FIG. 5 illustrates an operation that continues from the operation described with reference to FIG. 4. The host CAM 11 holds the XML file X2 generated by the bending machining CAM 14 in FIG. 4. The information processing apparatus 3A controls the machining information. The host CAM 11 supplies the XML file X2 to the punch machining CAM 12. The punch machining CAM 12 controls the punch machining information by having reflected thereon the laser machining information and the bending machining information included in the XML file X2. For example, the punch machining CAM 12 controls the punch machining information to avoid unevenness or damage on a portion of the workpiece used for support, position or the like in the subsequent laser machining process or bending machining process. The punch machining CAM 12 updates the punch machining information in the XML file X2 with the optimized punch machining information. The punch machining CAM 12 generates an XML file X2A including the updated punch machining information, and supplies the XML file X2A to the host CAM 11.

The host CAM 11 supplies the updated XML file X2A to the laser machining CAM 13. The laser machining CAM 13 controls the laser machining information by having reflected thereon the updated punch machining information included in the XML file X2A and the bending machining information. For example, the laser machining CAM 13 controls the laser machining information such that the laser machining information matches the updated punch machining information. In addition, the laser machining CAM 13 controls the laser machining information to avoid unevenness or damage on a portion of the workpiece used for support, position or the like in the subsequent bending machining process. The laser machining CAM 13 updates the laser machining information in the XML file X2A with the optimized laser machining information. The laser machining CAM 13 generates an XML file X2B including the updated laser machining information, and supplies the XML file X2B to the host CAM 11.

The host CAM 11 supplies the updated XML file X2B to the bending machining CAM 14. The bending machining CAM 14 controls the bending machining information by having reflected thereon the updated punch machining information included in the XML file X2B and the updated bending machining information. For example, the bending machining CAM 14 controls the bending machining information such that the bending machining information matches the updated punch machining information and the updated laser machining information. The bending machining CAM 14 updates the bending machining information in the XML file X2B with the optimized bending machining information. The bending machining CAM 14 generates an XML file X3 including the updated bending machining information, and supplies the XML file X3 to the host CAM 11. The host CAM 11 updates the XML file X2 to the XML file X3. The host CAM 11 may perform the control process described above twice or more.

Figure 6:
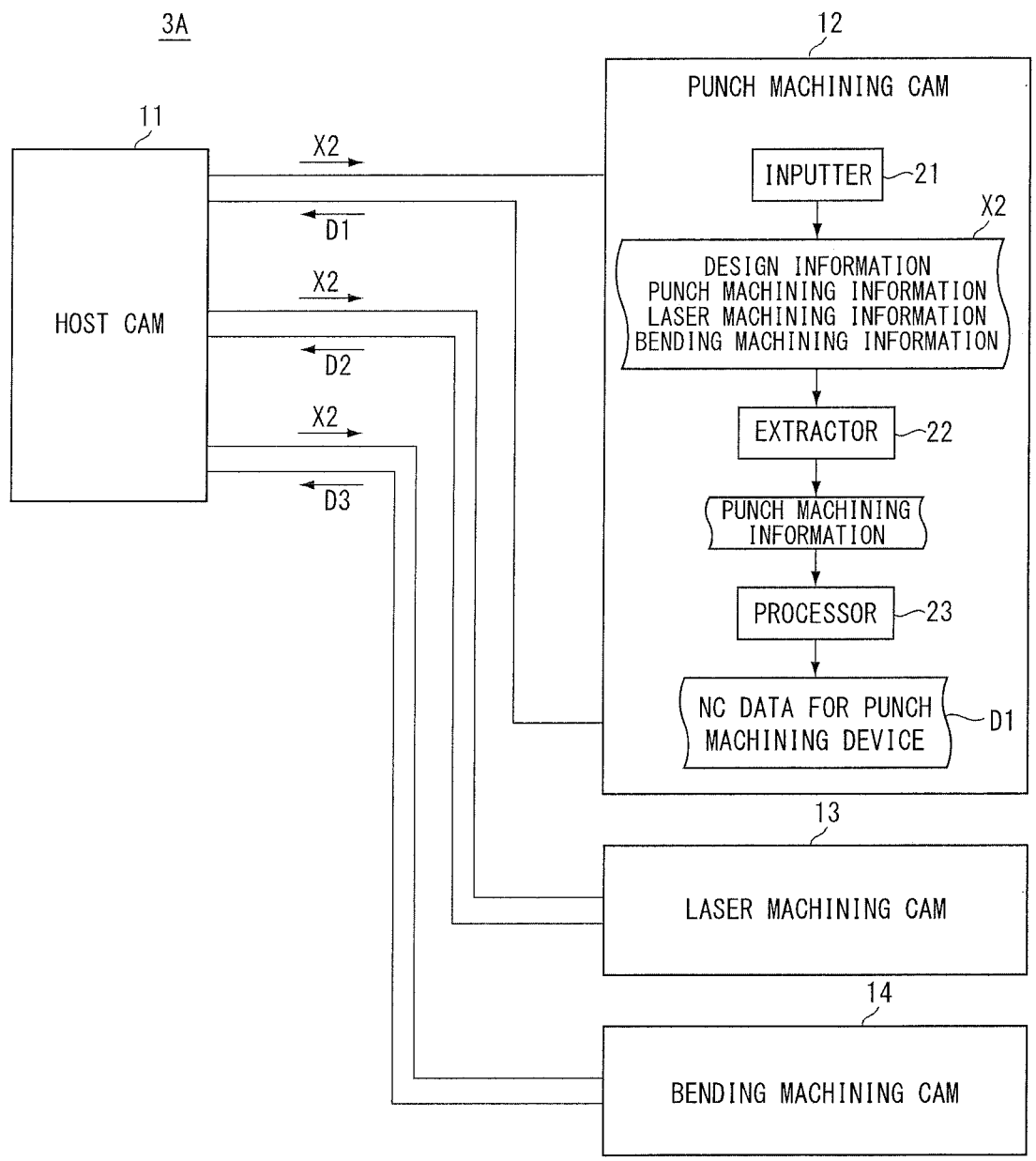
FIG. 6 is a conceptual diagram illustrating an example of how the information processing apparatus operates in generating NC data.

Referring back to FIG. 1, the information processing apparatus 3A generates NC data on the basis of an XML file including machining information such as the XML file X2 or the XML file X3. FIG. 6 is a conceptual diagram illustrating an example of how the information processing apparatus 3A operates in generating NC data. An example of using the XML file X2 is described herein. The optimized XML file X3 may be used instead of the XML file X2.

The host CAM 11 supplies the XML file X2 to the punch machining CAM 12. The punch machining CAM 12 includes an inputter 21, an extractor 22, and a processor 23. The inputter 21 receives an input of the XML file X2. If the host CAM 11 and the punch machining CAM 12 are installed in different computer systems, the inputter 21 may be a device that reads the XML file X2 from a storage medium storing the XML file X2, or may be a communication device such as a LAN board capable of performing wired or wireless communication with the host CAM 11.

The extractor 22 extracts information corresponding to the type of machining process from the XML file X2 input to the inputter 21. The XML file X2 (see FIG. 3) includes the tag T31 of "punch machining information" defining a machining process to be performed by the punch machining device 6. The extractor 22 extracts position information on the machining line L3, the machining line L4 or the like corresponding to the type of machining process (punch machining process), with reference to the tag T31.

The processor 23 processes the information extracted by the extractor 22. For example, the extractor 22 extracts punch machining information for the punch machining device 6, and the processor 23 generates NC data D1 to be used for control on the punch machining device 6, which performs the punch machining process corresponding to the punch machining information extracted by the extractor 22. For example, the processor 23 generates the NC data D1, with reference to the punch machining information extracted by the extractor 22 and various types of information on the punch machining device 6. Examples of the various types of information on the punch machining device 6 include a mold type, an operation of each shaft, and a coordinate system used by the punch machining device 6. For example, the processor 23 generates the NC data D1 defining the mold used by the punch machining device 6 in each step and an operation condition for the punch machining device 6 to drive each shaft, and designating the mold and the operation condition in order of steps, for example, on the basis of the punch machining information. The punch machining CAM 12 supplies the NC data D1 to the host CAM 11.

The laser machining CAM 13 and the bending machining CAM 14 each have the same configuration as that of the punch machining CAM 12, and descriptions therefor will be simplified or omitted. The host CAM 11 supplies the XML file X2 to the laser machining CAM 13. The XML file X2 (see FIG. 3) includes the tag T32 of "laser machining information" defining a machining process to be performed by the laser machining device 7, and an extractor (not illustrated) in the laser machining CAM 13 extracts position information on the machining line L1, the machining line L2 or the like corresponding to the type of machining process (laser machining process), with reference to the tag T32. A processor (not illustrated) in the laser machining CAM 13 generates NC data D2 to be used for control on the laser machining device 7, on the basis of the laser machining information extracted by the extractor. The laser machining CAM 13 supplies the NC data D2 generated by the processor to the host CAM 11.

The host CAM 11 supplies the XML file X2 to the bending machining CAM 14. The XML file X2 (see FIG. 3) includes the tag T33 of "bending machining information" defining a machining process to be performed by the bending machining device 8. An extractor (not illustrated) in the bending machining CAM 14 extracts position information on the machining line L5, the machining line L6 or the like corresponding to the type of machining process (bending machining process), with reference to the tag T33. A processor (not illustrated) in the bending machining CAM 14 generates NC data D3 to be used for control on the bending machining device 8, on the basis of the bending machining information extracted by the extractor. The bending machining CAM 14 supplies the NC data D3 generated by the processor to the host CAM 11.

Referring back to FIG. 1, the host CAM 11 supplies the NC data D1 for a punch machining device to the punch machining device 6. The punch machining device 6 performs a punch machining process on the workpiece W in accordance with the NC data D1. For example, the punch machining device 6 uses a mold with a cutting blade to perform the machining process (cutting machining process) to punch a hole in the workpiece W to form a window hole W1 corresponding to the machining line L3 (see FIG. 3). The punch machining device 6 performs a punch machining process to form a pilot hole on the inner side of the machining line L4 (see FIG. 3), and then bends the periphery of the pilot hole to form a burring portion W2.

The host CAM 11 supplies the NC data D2 for a laser machining device to the laser machining device 7. The laser machining device 7 performs the laser machining process on the workpiece W in accordance with the NC data D2. For example, the laser machining device 7 forms a window hole W3 corresponding to the machining line L2 (see FIG. 3) by cutting the workpiece W through laser beam irradiation. Then, the laser machining device 7 cuts the workpiece W through laser beam irradiation to form an outer circumference line W4 corresponding to the machining line L1 (see FIG. 3). Thus, the part OB2 under the manufacturing process is cut away from the workpiece to be separable from the workpiece W.

The host CAM 11 supplies the NC data D3 for a bending machining device to the bending machining device 8. The bending machining device 8 is a press brake, for example, and performs the bending machining process in accordance with the NC data D3. For example, the bending machining device 8 performs the bending machining process, along the machining line L5 and the machining line L6 illustrated in FIG. 3, on the part OB2 under the manufacturing process.

Figure 7:
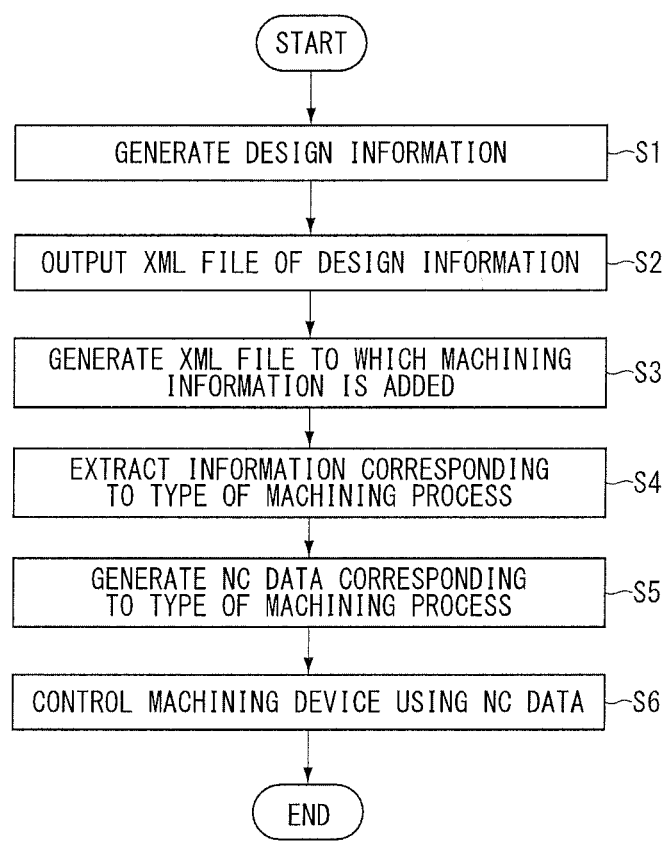
FIG. 7 is a flowchart illustrating a machining process method to which an information processing method according to the example is applied.

An information processing method will now be described on the basis of how the information processing apparatus 3A as described above operates. FIG. 7 is a flowchart illustrating a machining process method to which the information processing method is applied. In step S1, the design device 2 generates design information. In step S2, the design device 2 outputs an XML file X1 of the design information, and the XML file X1 is input to the information processing apparatus 3A. In step S3, the information processing apparatus 3A generates an XML file X2 (see FIG. 4) to which the machining information is added. In step S3, the information processing apparatus 3A may control the machining information (see FIG. 5). In step S4, the extractor 22 in the punch machining CAM 12 extracts information corresponding to the type of machining process. For example, the extractor 22 searches for the tag T31 (see FIG. 3) of the XML file X2, and extracts information stored in the tag T31 from an XML file X4, as information corresponding to the type of machining process performed by the punch machining device 6 corresponding to the punch machining CAM 12. In step S5, the processor 23 generates NC data D1 corresponding to the type of machining process. The NC data D1 is supplied to the punch machining device 6. In step S6, the punch machining device 6 is controlled using the NC data D1, and the punch machining device 6 performs the punch machining process on the workpiece W. The laser machining CAM 13 and the bending machining CAM 14 generate NC data D2 and NC data D3, respectively, in the same manner as the punch machining CAM 12 does. The laser machining device 7 and the bending machining device 8 are controlled using the NC data D2 and the NC data D3, respectively.

In the above-described example, the information processing apparatus 3A includes, for example, a computer system. The information processing apparatus 3A reads a program stored in a storage device (not illustrated), and performs various types of processing in accordance with the program. This program, for example, processes data including a data structure defining a plurality of machining processes selected from a laser cutting process, a punch cutting process, and a non-cutting process and implemented on a plate workpiece. The data structure includes shape information defining positions of machining lines that serve as targets of the machining processes, and machining information defining a type of each machining process corresponding to each machining line among the machining processes. The shape information and the machining information are described in XML. This program causes a computer to execute receiving an input of data, and extracting information corresponding to the type of the machining process from the data. The program may be recorded in a computer-readable recording medium for distribution.

The information processing apparatus 3A does not necessarily include the processor 23, for example. The processor 23 may be provided in an external apparatus to the information processing apparatus 3A in the machining system 1A. The processor 23 may perform other types of processing than the generation of the NC data D1. For example, the processor 23 may perform a process of estimating a cost required to manufacture a part, on the basis of the information on the type of machining process extracted by the extractor 22. The information processing apparatus 3A may be at least partially provided in the apparatus (e.g., a computer system) that includes the design device 2.

Second Example

Figure 8:
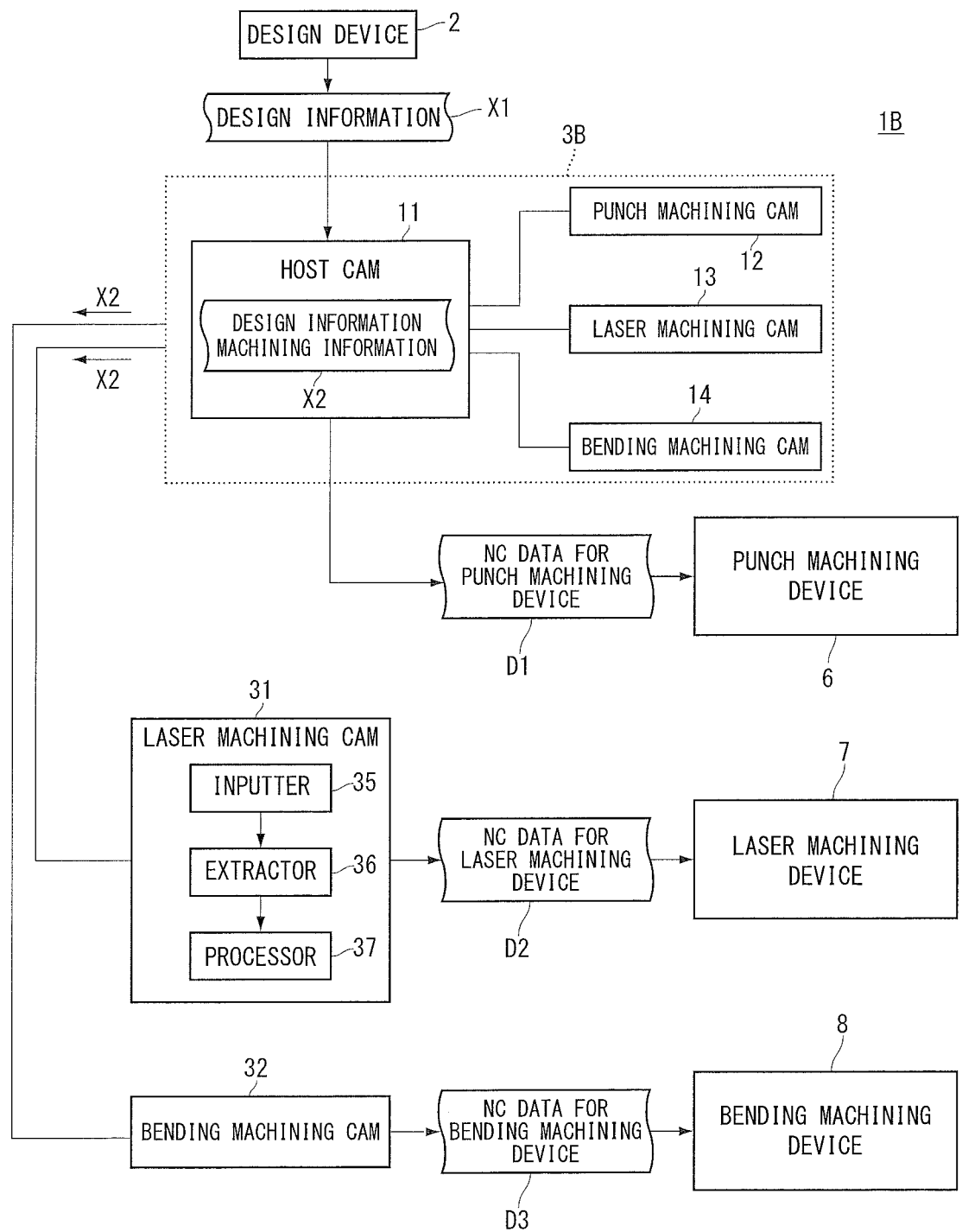
FIG. 8 is a conceptual diagram illustrating a machining system and an information processing apparatus according to a second example.

A second example will now be described. The configurations in this example that are the same as in the above-described example are denoted with the same reference signs and descriptions therefor will be omitted or simplified. FIG. 8 is a conceptual diagram illustrating a machining system 1B and an information processing apparatus 3B according to the second example. In the second example, the information processing apparatus 3B does not generate NC data for some of a plurality of machining process devices (the punch machining device 6, the laser machining device 7, and the bending machining device 8). In this example described herein, the information processing apparatus 3B generates the NC data D1 for a punch machining device, and does not generate the NC data D2 for a laser machining device and the NC data D3 for a bending machining device.

The machining system 1B includes a laser machining CAM 31 corresponding to the laser machining device 7, and a bending machining CAM 32 corresponding to the bending machining device 8. The laser machining CAM 31 and the bending machining CAM 32 are each an example of the information processing apparatus. The information processing apparatus 3B generates the XML file X2 including the machining information in the same manner as that of the information processing apparatus 3A described in the first example. The information processing apparatus 3B may use the XML file X3 including optimized machining information, instead of the XML file X2. The XML file X2 is supplied to each of the laser machining CAM 31 and the bending machining CAM 32. The XML file X2 may be transferred from the information processing apparatus 3B to the laser machining CAM 31 or the bending machining CAM 32 through wired or wireless communications or by using a storage medium.

The laser machining CAM 31 has the same configuration as that of the punch machining CAM 12 described with reference to FIG. 6, and includes an inputter 35, an extractor 36, and a processor 37. The inputter 35 receives an external input of the XML file X2. The XML file X2 (see FIG. 3) includes the tag T32 of "laser machining information" defining a machining process to be performed by the laser machining device 7, and the extractor 36 extracts position information on the machining line L1, the machining line L2 or the like corresponding to the type of machining process (laser machining process), with reference to the tag T32. The processor 37 generates NC data D2 to be used for control on the laser machining device 7, on the basis of the laser machining information extracted by the extractor 36. The laser machining CAM 31 supplies the NC data D2 generated by the processor 37 to the laser machining device 7.

The bending machining CAM 32 has the same configuration as that of the laser machining CAM 31, and descriptions therefor will be simplified or omitted. The XML file X2 (see FIG. 3) includes the tag T33 of "bending machining information" defining a machining process to be performed by the bending machining device 8, and an extractor (not illustrated) in the bending machining CAM 32 extracts position information on the machining line L5, the machining line L6 or the like corresponding to the type of machining process (bending machining process), with reference to the tag T33. A processor (not illustrated) in the bending machining CAM 32 generates NC data D3 to be used for control on the bending machining device 8, on the basis of the bending machining information extracted by the extractor. The bending machining CAM 32 supplies the NC data D3 generated by the processor to the bending machining device 8.

Third Example

Figure 9:
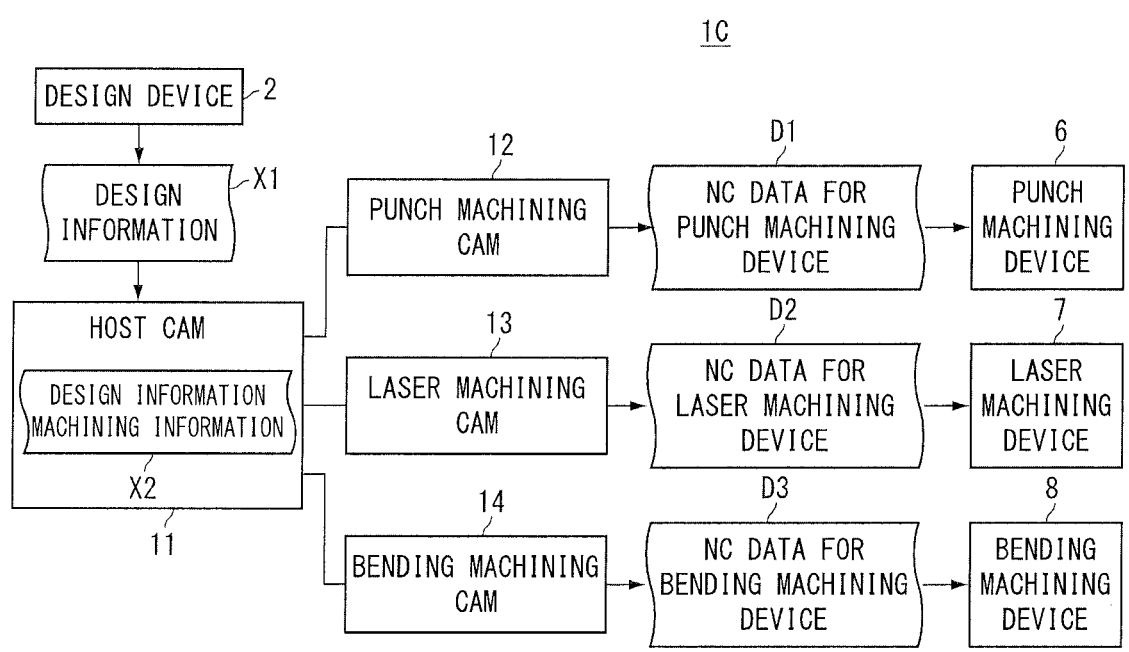
FIG. 9 is a conceptual diagram illustrating a machining system and an information processing apparatus according to a third example.

A third example will now be described. The configurations in this example that are the same as in the above-described examples are denoted with the same reference signs and descriptions therefor will be omitted or simplified. FIG. 9 is a conceptual diagram illustrating a machining system 1C and an information processing apparatus according to the third example. The information processing apparatus is provided with the punch machining CAM 12, the laser machining CAM 13, and the bending machining CAM 14. As illustrated in FIG. 4, the host CAM 11 causes each of the punch machining CAM 12, the laser machining CAM 13, and the bending machining CAM 14 to generate machining information and acquires the XML file X2 including the machining information. The host CAM 11 may acquire the XML file X3 including optimized machining information as described above with reference to FIG. 5.

The host CAM 11 supplies the XML file X2 to the punch machining CAM 12, and causes the punch machining CAM 12 to generate the NC data D1 for a punch machining device. As described above with reference to FIG. 6, the punch machining CAM 12 generates the NC data D1, and supplies the NC data D1 thus generated to the punch machining device 6. The host CAM 11 supplies the XML file X2 to the laser machining CAM 13, and causes the laser machining CAM 13 to generate the NC data D2 for a laser machining device. The laser machining CAM 13 generates the NC data D2, and supplies the NC data D2 thus generated to the laser machining device 7. The host CAM 11 supplies the XML file X2 to the bending machining CAM 14, and causes the bending machining CAM 14 to generate the NC data D3 for a bending machining device. The bending machining CAM 14 generates the NC data D3, and supplies the NC data D3 thus generated to the bending machining device 8. The NC data may be supplied from each machining CAM to a corresponding one of the machining devices in this manner.

Fourth Example

Figure 10:
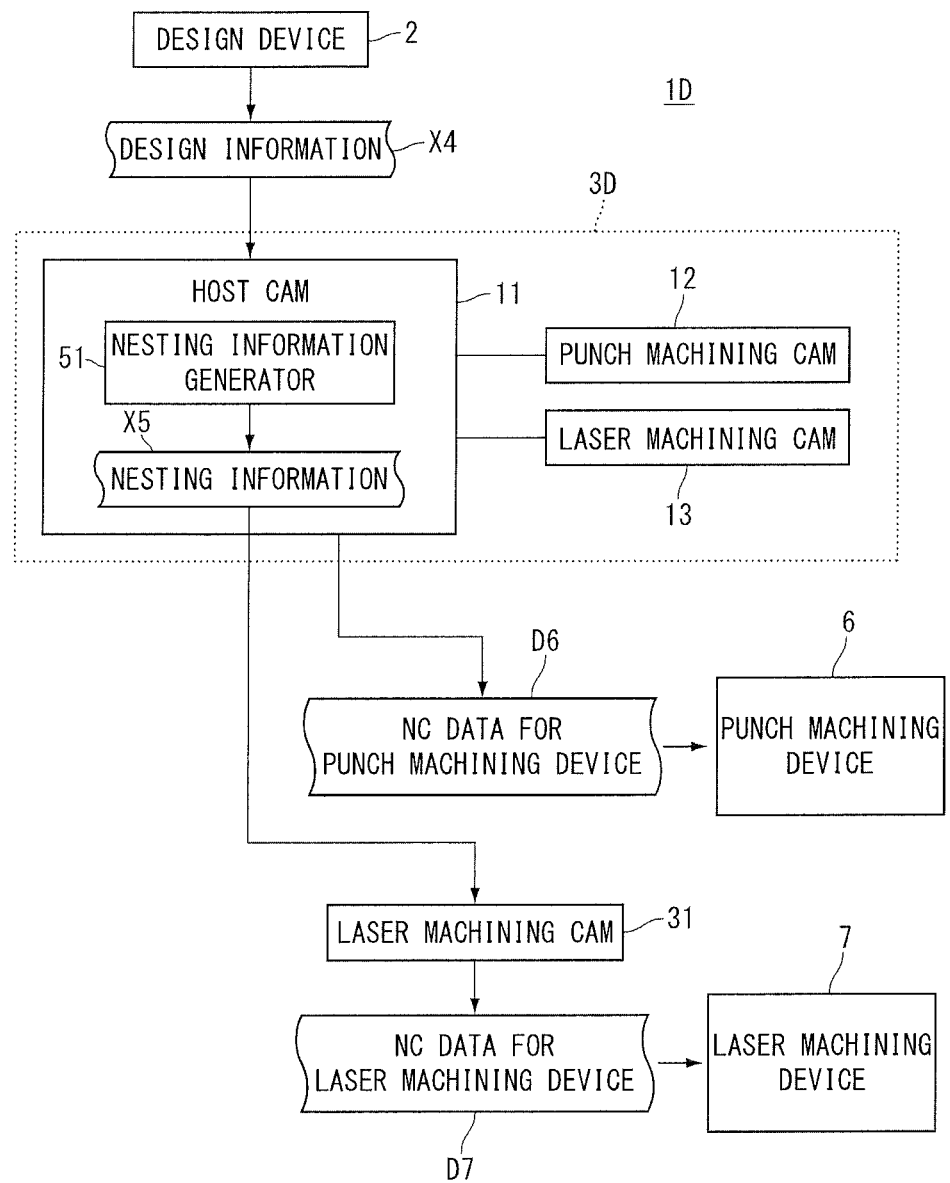
FIG. 10 is a conceptual diagram illustrating a machining system and an information processing apparatus according to a fourth example.

A fourth example will now be described. The configurations in this example that are the same as in the above-described examples are denoted with the same reference signs and descriptions therefor will be omitted or simplified. FIG. 10 is a conceptual diagram illustrating a machining system 1D and an information processing apparatus 3D according to this example. The XML file X4 of the design information includes shape information on a part made out of a plate workpiece through a plurality of machining processes (e.g., punch machining process and laser machining process). The information processor 3D includes a nesting information generator 51, and the nesting information generator 51 generates an XML file X5 on nesting information showing, in XML, a plurality of parts arranged in the plate workpiece.

Figure 11:
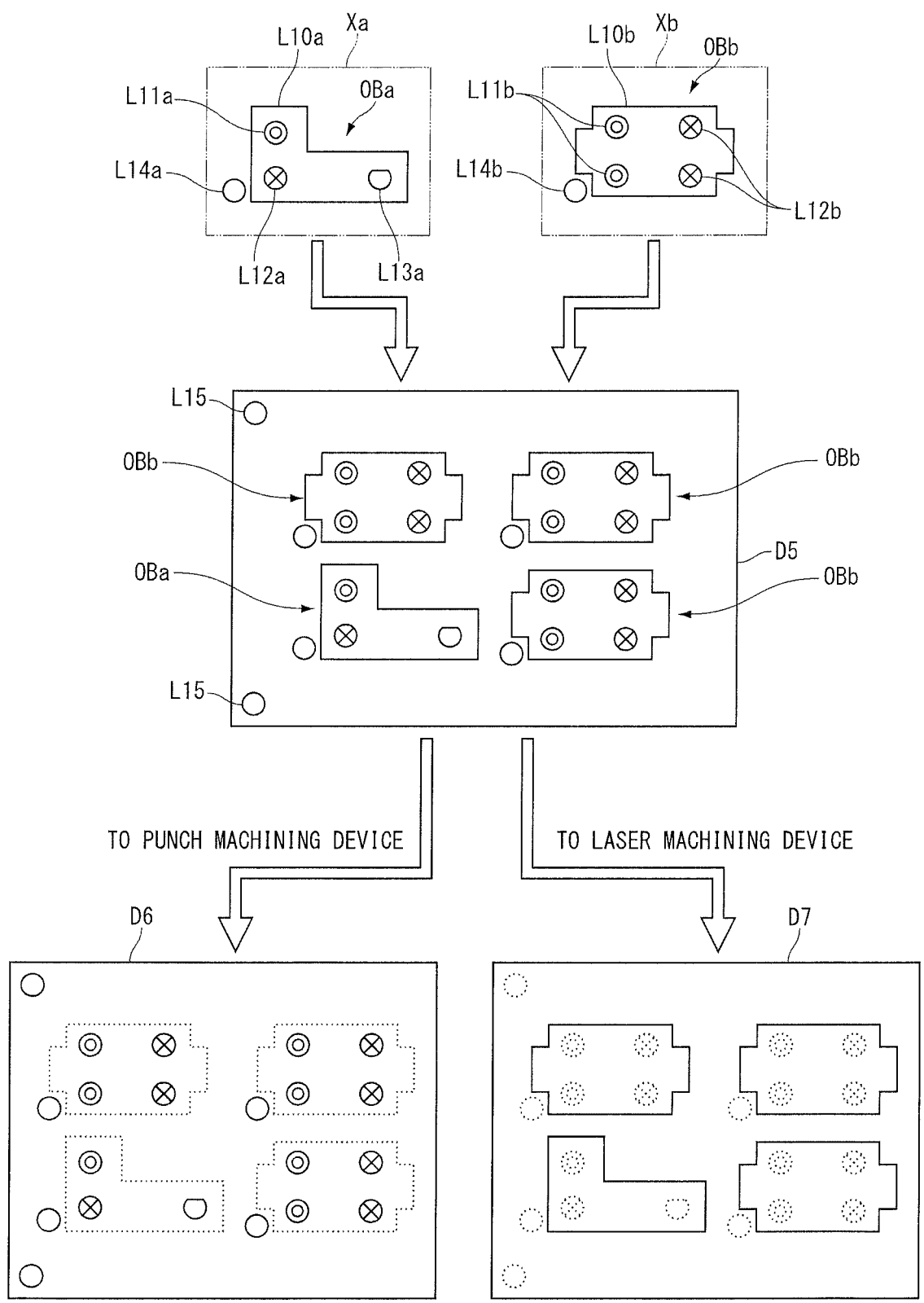
FIG. 11 is a conceptual diagram illustrating how an information processor according to the fourth example operates.

FIG. 11 is a conceptual diagram illustrating an example of how the information processor 3D according to this example operates. The XML file X4 (see FIG. 10) of the design information supplied to the information processor 3D includes design information Xa on a part OBa and design information Xb on a part OBb. The design information Xa and the design information Xb each have the same data structure as that of the XML file X1 described above in the first example. The design information Xa includes a machining line L10a (e.g., an outer circumference line) corresponding to a laser cutting process, a machining line L11a corresponding to burring, a machining line L12a corresponding to a tapping machining process, a machining line L13a corresponding to a special mold machining process, and a machining line L14a (e.g., alignment mark) corresponding to a punch cutting process. The design information Xb includes a machining line L10b (e.g., an outer circumference line) corresponding to a laser cutting process, a machining line L11b corresponding to burring, a machining line L12b corresponding to a tapping machining process, and a machining line L14b (e.g., alignment mark) corresponding to a punch cutting process. As described in the first example, the information processing apparatus 3D generates an XML file to which machining information is added for each of the design information Xa and the design information Xb.

The nesting information generator 51 (see FIG. 10) arranges the part OBa and the part OBb on a coordinate system in relation to the workpiece W, and generates nesting information D5. The nesting information generator 51 may automatically determine the arrangement of the part OBa and the part OBb, or manually or semiautomatically determine the arrangement by using a designated value from the user. For example, the nesting information D5 includes the position and the orientation of the part OBa, the position and the orientation of the part OBb, and the position of the machining line L15 corresponding to the alignment mark formed on the workpiece W. The machining line L15 corresponding to the alignment mark is formed in the punch cutting process, for example. The nesting information generator 51 generates an XML file (described with reference to FIG. 11 below) for the nesting information D5.

The information processing apparatus 3D extracts information corresponding to the type of machining process from the nesting information D5. For example, NC data D6 for a punch machining device is generated on the basis of the punch machining information extracted from the nesting information D5, and the NC data D6 is supplied to the punch machining device 6. The NC data D6 defines an operation of the punch machining device 6 corresponding to each of the machining lines (illustrated in solid lines) corresponding to the burring, the tapping machining process, the special mold machining process, and the punch cutting process. The NC data D6 does not define an operation of the punch machining device 6 for a machining line (illustrated in dotted lines) corresponding to the laser cutting process.

NC data D7 for a laser machining device is generated on the basis of the laser machining information extracted from the nesting information D5 and is supplied to the laser machining device 7. The NC data D7 defines an operation of the laser machining device 7 for a machining line (illustrated in solid lines) corresponding to the laser cutting process. The NC data D7 does not define an operation of the laser machining device 7 for a machining line (illustrated in dotted lines) serving as a target of the machining process by the punch machining device 6.

Figure 12:
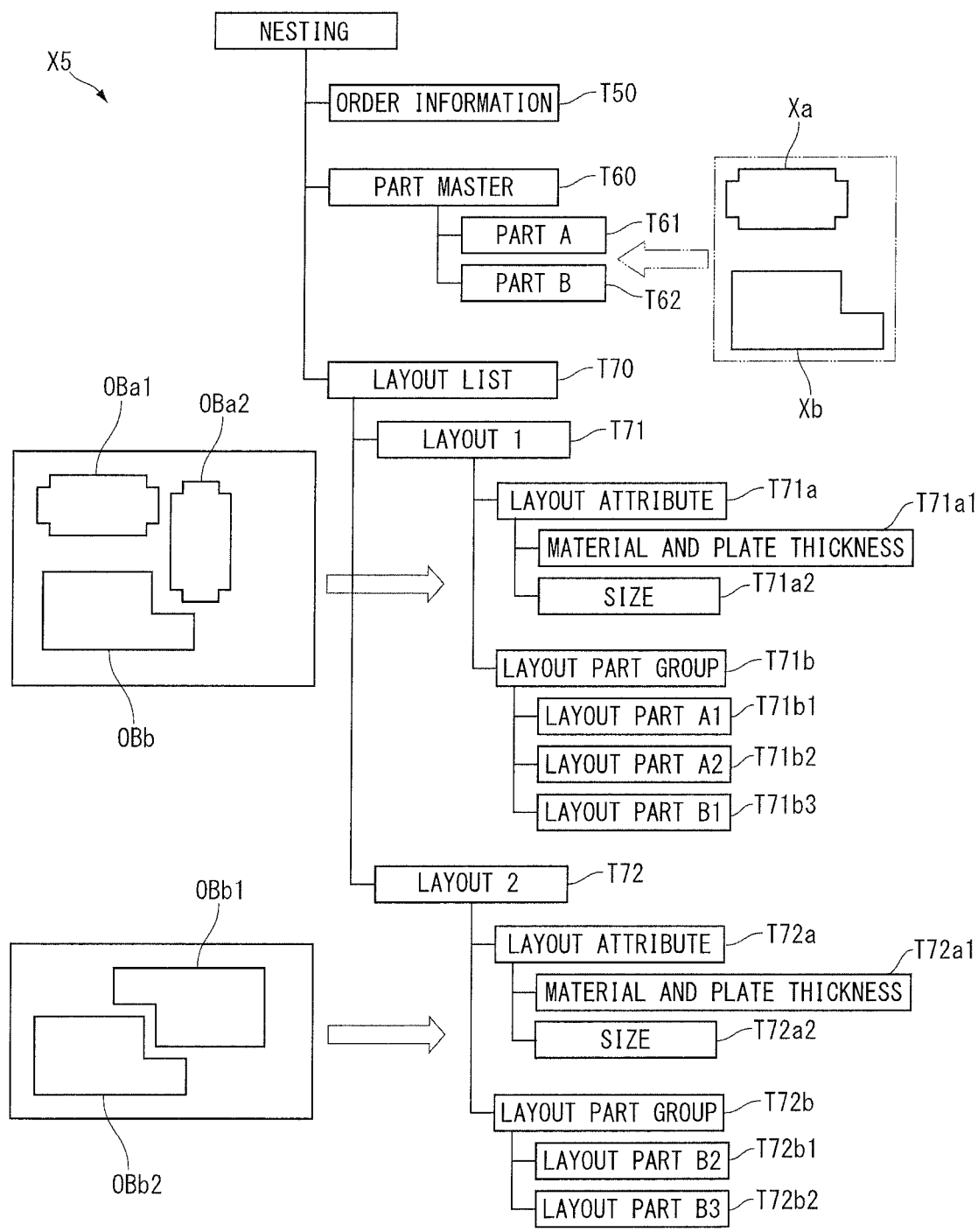
FIG. 12 is a conceptual diagram illustrating an example of an XML file of nesting information according to the fourth example.

FIG. 12 is a conceptual diagram illustrating an example of the XML file X5 of nesting information. The XML file X5 has a tiered structure of tags each storing associated information. An upper level tag T50 corresponds to information on "order information". An upper level tag T60 corresponds to information on "part master". Tags T61 and T62 are subordinate to the tag T60 and respectively have an element name "part A" and an element name "part B". A link to the design information and the machining information on the part OBa and a link to the design information and the machining information on the part OBb are stored in the tag T61. The design information and the machining information on the part OBa may be stored in the tag T61, and the design information and the machining information on the part OBb may be stored in the tag T62.

An upper level tag T70 has an element name "layout list", and corresponds to information on an arrangement of the part OBa and the part OBb. Tags T71 and T72 are subordinate to the tag T70 and respectively have an element name "layout 1" and an element name "layout 2". The tag T71 is provided with a tag T71a having an element name "layout attribute" and a tag T71b having an element name "layout part group". Tags T71a1 and T71a2 are subordinate to the tag T71a and respectively have an element name "material and plate thickness" and an element name "size". The material of the workpiece and the thickness of the workpiece, and flat dimensions of the workpiece all of which are designated by the user are respectively stored in the tags T71a1 and T71a2.

In this example, the "layout 1" includes two parts OBa (a part OBa1 and a part OBa2) and a single part OBb. Tags T71b1, T71b2, and T71b3 are subordinate to the tag T71b and respectively have an element name "layout part A1", an element name "layout part A2", and an element name "layout part B1". The position and the orientation of the part OBa1 are stored in the tag T71b1. The position and the orientation of the part OBa2 are stored in the tag T71b2. The position and the orientation of the part OBb are stored in the tag T71b3.

The tag T72 corresponding to the "layout 2" has the same structure as the tag T71 for the "layout 1". The tag T72 is provided with a tag T72a having an element name "layout attribute" and a tag T72b having an element name "layout part group". Tags T72a1 and T72a2 are subordinate to the tag T72a and respectively have an element name "material and plate thickness" and an element name "size". The material of the workpiece and the thickness of the workpiece, and flat dimensions of the workpiece all of which are designated by the user are respectively stored in the tags T72a1 and T72a2.

In this example, the "layout 2" includes two parts OBb (a part OBb1 and a part OBb2). Tags T72b1 and T72b2 are subordinate to the tag T72b and respectively have an element name "layout part B2" and an element name "layout part B3". The position and the orientation of the part OBb1 are stored in the tag T72b1. The position and the orientation of the part OBb2 are stored in the tag T72b2.

The data structure (XML file X5) described above is merely an example, and can be modified in various ways including adding or deleting a tag (element) or changing information stored in a tag. For example, the XML file X5 illustrated in FIG. 7 includes two types of tags, that is, the "part A" and the "part B". Alternatively, the number of types of parts in the XML file X5 may be one or three or more. The XML file X5 in FIG. 11 includes two types of layouts (the layout 1 and the layout 2). However, the number of types of layouts included in the XML file X5 may be one or three or more.

Referring back to FIG. 10, the host CAM 11 supplies the XML file X5 of the nesting information to the punch machining CAM 12, and causes the punch machining CAM 12 to generate the NC data D6 for a punch machining device. The punch machining CAM 12 is the same as in FIG. 6. The extractor 22 (see FIG. 6) extracts information corresponding to the type of machining process from the nesting information. The XML file X5 (see FIG. 12) of the nesting information is associated with the machining information on the part OBa. For example, the extractor 22 extracts the position and the orientation of the part OBa from the tag T71*b*1 for the "arranged part A1", and extracts punch machining information on the part OBa related to the punch machining device 6 from the machining information associated with the part OBa. The processor 23 (see FIG. 6) generates the NC data D6 to be used for control on the punch machining device 6, which performs a punch machining process corresponding to the punch machining information extracted by the extractor 22. The NC data D6 generated by the processor 23 is supplied to the punch machining device 6 via the host CAM 11. The punch machining device 6 performs the punch machining process on the workpiece W in accordance with the NC data D6.

The machining system 1D is provided with the laser machining CAM 31 serving as the information processing apparatus according to this example. The laser machining CAM 31 is the same as in FIG. 8. The XML file X5 of the nesting information generated by the nesting information generator 51 is supplied to the laser machining CAM 31. The inputter 35 (see FIG. 8) in the laser machining CAM 31 receives an input of the XML file X5. The extractor 36 (see FIG. 8) in the laser machining CAM 31 extracts the laser machining information for the laser machining device 7. The processor 37 (see FIG. 8) in the laser machining CAM 31 generates NC data D7 to be used for control on the laser machining device 7, which performs a laser machining process corresponding to the laser machining information extracted by the extractor 36. The laser machining CAM 31 supplies the NC data D7 generated by the processor 37 to the laser machining device 7. The laser machining device 7 performs the laser machining process on the workpiece W in accordance with the NC data D7.

The technical scope of this disclosure is not limited to the aspects described in the above-mentioned examples, for example. One or more requirements described in the above-mentioned examples can be omitted. The requirements described in the above-mentioned examples can be combined as appropriate. The disclosure of Japanese Patent Application No. 2015-226367 and all the documents cited in the above-mentioned examples and the like are incorporated herein by reference.

The invention claimed is:

1. An information processing apparatus that processes data including a data structure defining a plurality of machining processes selected from a laser cutting process, a punch cutting process, and a non-cutting process and implemented on a plate workpiece,
the information processing apparatus comprising:
a host CAM;
a plurality of CAMs corresponding to types of the machining processes,
wherein the data structure includes shape information defining positions of machining lines that serve as targets of the machining processes, information required for the workpiece including tolerance, configuration information on assembly or composition, and machining information defining a type of each machining process corresponding to each machining line among the machining processes, the shape information, the information required for the workpiece including tolerance, the configuration information, and the machining information being described in XML,
each of the CAMs generates the machining information on the basis of the shape information, the information required for the workpiece including tolerance, and the configuration information to provide the data, and
the host CAM causes the CAMs to sequentially update the machining information by supplying updated machining information from one of the CAMs in the data to a different CAM and causing the different CAM to reflect on the updated machining information,
each of the CAMs comprises an inputter that receives an input of the data including the updated machining information and an extractor that extracts information corresponding to the type of the machining process from the data input to the inputter,
wherein
the machining information includes position information on a machining line described in a tag set for each type of machining process, and
the extractor extracts the position information on the machining line corresponding to the type of machining process with reference to the tag set.

2. The information processing apparatus according to claim 1, further comprising a processor that processes the information extracted by the extractor.

3. The information processing apparatus according to claim 2, wherein the processor generates numerical control data to be used for control on the machining device that performs the machining process corresponding to the information extracted by the extractor.

4. The information processing apparatus according to claim 1, wherein
the data includes the shape information and the machining information on a part made out of the plate workpiece through the plurality of machining processes, and
the information processing apparatus comprises a nesting information generator that generates nesting information showing, in XML, a plurality of the parts arranged in the plate workpiece.

5. The information processing apparatus according to claim 1, wherein the non-cutting process includes at least one of a forming machining process, a tapping machining process, and a marking machining process.

6. A machining system comprising:
the information processing apparatus according to claim 1; and
a machining device that performs a machining process on the plate workpiece on the basis of data supplied from the information processing apparatus.

7. An information processing method of processing data including a data structure defining a plurality of machining processes selected from a laser cutting process, a punch cutting process, and a non-cutting process and implemented on a plate workpiece, with the information processing apparatus according to claim 1,
the data structure including shape information defining positions of machining lines that serve as targets of the machining processes, information required for the workpiece including tolerance, configuration information on assembly or composition, and machining information defining a type of each machining process corresponding to each machining line among the machining processes, the shape information, the information required for the workpiece including tolerance, the configuration information, and the machining information being described in XML,
the information processing method comprising:

generating the machining information based on the shape information, the information required for the workpiece including tolerance, and the configuration information to provide the data;

sequentially updating a plurality of pieces of the machining information by reflecting on a first piece of the machining information and updating a second piece of the machining information in the data;

receiving an input of the data including the updated machining information; and extracting information corresponding to the type of the machining process from the data.

8. The information processing apparatus according to claim 2, wherein the data includes the shape information and the machining information on a part made out of the plate workpiece through the plurality of machining processes, and the information processing apparatus comprises a nesting information generator that generates nesting information showing, in XML, a plurality of the parts arranged in the plate workpiece.

9. The information processing apparatus according to claim 3, wherein the data includes the shape information and the machining information on a part made out of the plate workpiece through the plurality of machining processes, and the information processing apparatus comprises a nesting information generator that generates nesting information showing, in XML, a plurality of the parts arranged in the plate workpiece.

10. The information processing apparatus according to claim 2, wherein the non-cutting process includes at least one of a forming machining process, a tapping machining process, and a marking machining process.

11. The information processing apparatus according to claim 3, wherein the non-cutting process includes at least one of a forming machining process, a tapping machining process, and a marking machining process.

12. The information processing apparatus according to claim 4, wherein the non-cutting process includes at least one of a forming machining process, a tapping machining process, and a marking machining process.

13. A machining system comprising:

the information processing apparatus according to claim 2; and a machining device that performs a machining process on the plate workpiece on the basis of data supplied from the information processing apparatus.

14. A machining system comprising:

the information processing apparatus according to claim 3; and a machining device that performs a machining process on the plate workpiece on the basis of data supplied from the information processing apparatus.

15. The information processing apparatus according to claim 1, wherein each tag of the tag set has a tiered structure.

* * * * *